US011131896B2

(12) United States Patent
Hayashida et al.

(10) Patent No.: US 11,131,896 B2
(45) Date of Patent: Sep. 28, 2021

(54) LIGHT CONTROL SHEETS AND IMAGING SYSTEMS

(71) Applicant: TOPPAN PRINTING CO., LTD., Taito-ku (JP)

(72) Inventors: Yasushi Hayashida, Taito-ku (JP); Akiko Nagai, Taito-ku (JP); Koichi Makidai, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 16/369,549

(22) Filed: Mar. 29, 2019

(65) Prior Publication Data

US 2019/0227354 A1    Jul. 25, 2019

Related U.S. Application Data

(63) Continuation of application No. PCT/JP2017/035969, filed on Oct. 3, 2017.

(30) Foreign Application Priority Data

Oct. 3, 2016    (JP) .............................. JP2016-195879

(51) Int. Cl.
*G02F 1/137*    (2006.01)
*G02F 1/133*    (2006.01)
(Continued)

(52) U.S. Cl.
CPC ............ *G02F 1/137* (2013.01); *G02F 1/1334* (2013.01); *G02F 1/13306* (2013.01);
(Continued)

(58) Field of Classification Search
CPC .............. G02F 1/13306; G02F 1/1334; G02F 1/13439; G02F 1/13476; G02F 1/137;
(Continued)

(56) References Cited

U.S. PATENT DOCUMENTS 3,579,118 A * 5/1971 Rhodes ..................... H03K 3/04
377/110
3,603,126 A * 9/1971 Newman .................. B21J 15/18
72/28.1
(Continued)

FOREIGN PATENT DOCUMENTS

CN    104536188 A    4/2015
CN    105911738 A    8/2016
(Continued)

OTHER PUBLICATIONS

International Search Report dated Dec. 26, 2017 in PCT/JP2017/035969, filed Oct. 3, 2017, 5 pages.
(Continued)

*Primary Examiner* — Hoan C Nguyen
(74) *Attorney, Agent, or Firm* — Oblon, McClelland, Maier & Neustadt, L.L.P.

(57) ABSTRACT

A light control sheet including a first transparent electrode, a second transparent electrode, a first light control layer positioned between the first and second transparent electrodes, and having light transmission property which is variable by a change in a voltage across the first and second transparent electrodes, and a voltage control unit which applies an AC voltage across the first and second transparent electrodes, and changes a frequency of the AC voltage applied.

20 Claims, 9 Drawing Sheets

(51) Int. Cl.
*G02F 1/1347* (2006.01)
*G02F 1/1334* (2006.01)
*G02F 1/1343* (2006.01)
*G03B 7/26* (2021.01)
*G03B 9/08* (2021.01)

(52) U.S. Cl.
CPC ...... *G02F 1/13439* (2013.01); *G02F 1/13476* (2013.01); *G03B 7/26* (2013.01); *G03B 9/08* (2013.01); *G02F 1/13345* (2021.01); *G02F 1/13347* (2021.01); *G02F 2203/01* (2013.01)

(58) Field of Classification Search
CPC . G02F 2001/13345; G02F 2001/13347; G02F 2203/01; G03B 9/08; G03B 7/26
See application file for complete search history.

(56) References Cited

U.S. PATENT DOCUMENTS

| | | | | |
|---|---|---|---|---|
| 3,611,297 A | * | 10/1971 | Kramer | H03J 9/04 340/12.18 |
| 3,653,044 A | * | 3/1972 | Breeze | G01S 7/298 342/185 |
| 3,983,559 A | * | 9/1976 | Honore | G01S 1/30 342/394 |
| 4,520,235 A | * | 5/1985 | Morikawa | H04M 9/003 379/164 |
| 4,954,726 A | * | 9/1990 | Lipman | H02M 7/529 307/46 |
| 5,267,067 A | | 11/1993 | Wiget | |
| 5,548,420 A | * | 8/1996 | Koshimizu | G02F 1/132 349/168 |
| 2004/0021811 A1 | * | 2/2004 | Matsuki | G02F 1/1393 349/113 |
| 2006/0152293 A1 | * | 7/2006 | McCorquodale | H03B 5/1253 331/74 |
| 2007/0092177 A1 | * | 4/2007 | Nilsson | H01S 5/0265 385/14 |
| 2008/0164818 A1 | * | 7/2008 | Ichikawa | H05B 41/2887 315/77 |
| 2009/0002085 A1 | * | 1/2009 | Tarng | G08B 13/19636 331/167 |
| 2009/0316254 A1 | * | 12/2009 | Higashida | G02F 1/172 359/296 |
| 2010/0020108 A1 | * | 1/2010 | Cho | G09G 3/3406 345/690 |
| 2010/0211902 A1 | * | 8/2010 | Unsworth | G06F 3/046 715/769 |
| 2012/0120335 A1 | | 5/2012 | Galstian et al. | |
| 2012/0162292 A1 | * | 6/2012 | Mori | G02F 1/172 345/691 |
| 2012/0169650 A1 | * | 7/2012 | Chang | G06F 3/0447 345/174 |
| 2014/0028404 A1 | * | 1/2014 | Kihara | H04L 9/0662 331/78 |
| 2014/0028924 A1 | * | 1/2014 | Yamaguchi | G02F 1/29 349/1 |
| 2014/0118127 A1 | * | 5/2014 | Levesque | G06F 3/016 340/407.2 |
| 2015/0169108 A1 | * | 6/2015 | Ishii | G06F 3/04184 345/174 |

FOREIGN PATENT DOCUMENTS

| | | |
|---|---|---|
| JP | 5-80301 A | 4/1993 |
| JP | 6-11694 A | 1/1994 |
| JP | 2015-215417 A | 12/2015 |
| JP | 2015-215420 A | 12/2015 |
| JP | 2016-80770 A | 5/2016 |
| JP | 2018185490 A * | 11/2018 |

OTHER PUBLICATIONS

Extended European Search Report dated Jul. 8, 2019 in Patent Application No. 17858393.6, 8 pages.

* cited by examiner

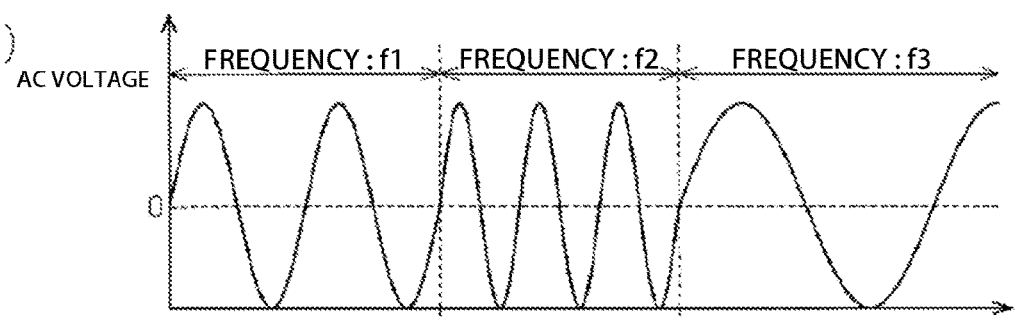
FIG.7(a) AC VOLTAGE
FIG.7(b) TIMING WHEN LIGHT CONTROL LAYER ALLOWS LIGHT TRANSMISSION
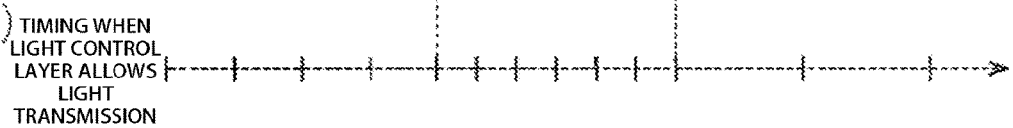
FIG.7(c) TIMING WHEN CAMERA CAPTURES IMAGE (NOT PERMITTED)
FIG.7(d) TIMING WHEN CAMERA CAPTURES IMAGE (PERMITTED)
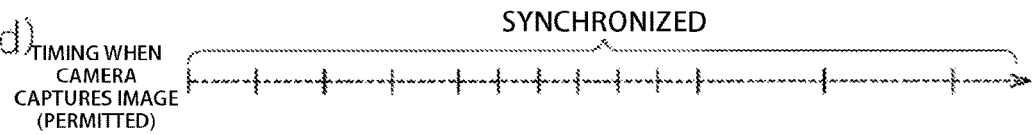

FIG.9(a) FIRST AC VOLTAGE
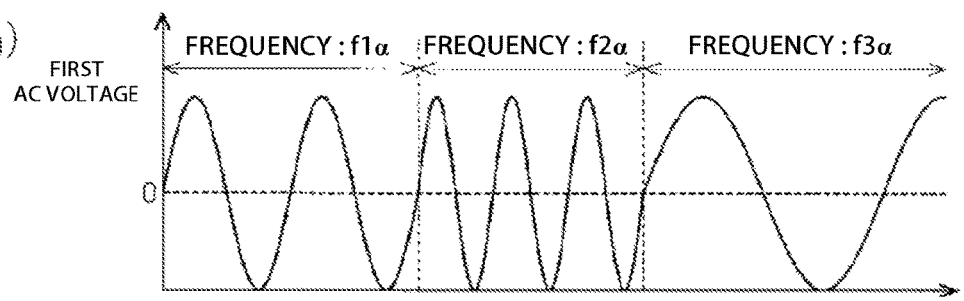
FREQUENCY : f1α   FREQUENCY : f2α   FREQUENCY : f3α
FIG.9(b) SECOND AC VOLTAGE
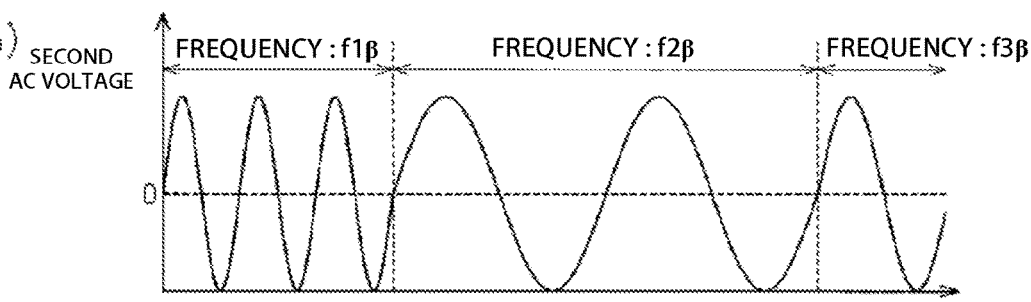
FREQUENCY : f1β   FREQUENCY : f2β   FREQUENCY : f3β
FIG.9(c) TIMING WHEN FIRST LIGHT CONTROL LAYER ALLOWS LIGHT TRANSMISSION
FIG.9(d) TIMING WHEN SECOND LIGHT CONTROL LAYER ALLOWS LIGHT TRANSMISSION
FIG.9(e) TIMING WHEN CAMERA CAPTURES IMAGE
NOT SYNCHRONIZED FIG.11(a) FIRST AC VOLTAGE
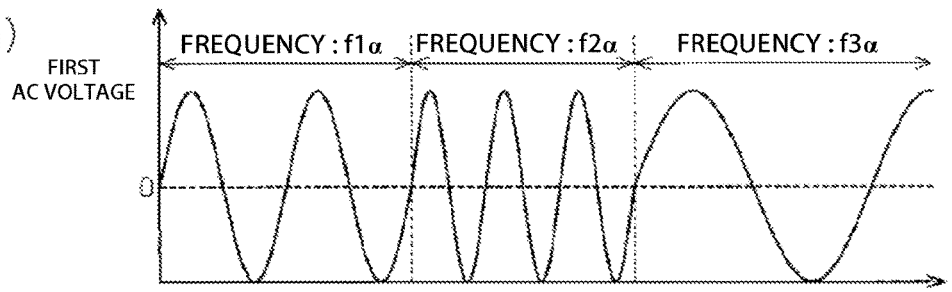
FIG.11(b) SECOND AC VOLTAGE
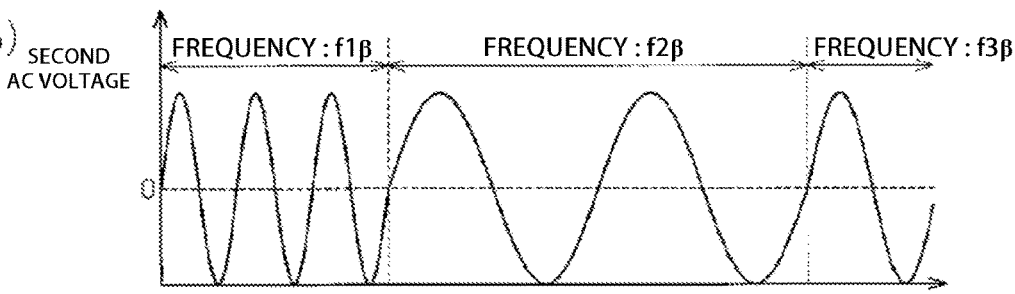
FIG.11(c) TIMING WHEN FIRST LIGHT CONTROL LAYER ALLOWS LIGHT TRANSMISSION
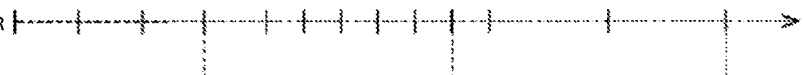
FIG.11(d) TIMING WHEN SECOND LIGHT CONTROL LAYER ALLOWS LIGHT TRANSMISSION
FIG.11(e) TIMING WHEN CAMERA CAPTURES IMAGE (NOT PERMITTED)
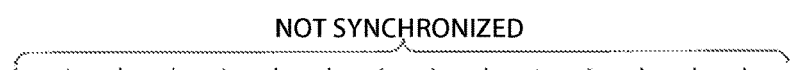
FIG.11(f) TIMING WHEN CAMERA CAPTURES IMAGE (PERMITTED)
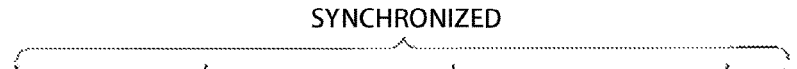

LIGHT CONTROL SHEETS AND IMAGING SYSTEMS

CROSS-REFERENCE TO RELATED APPLICATIONS

The present application is a continuation of International Application No. PCT/JP2017/035969, filed Oct. 3, 2017, which is based upon and claims the benefits of priority to Japanese Application No. 2016-195879, filed Oct. 3, 2016. The entire contents of these applications are incorporated herein by reference.

BACKGROUND OF THE INVENTION

Field of the Invention

The present invention relates to light control sheets that can switch between transparency and translucency to light, and an imaging system having the light control sheet.

Discussion of the Background

As described in JP 2015-215417 A, there have been known light control sheets that can switch between transparency and translucency to light by alteration of the voltage applied to a light control layer. Light control sheets can be categorized, for example, into a normal type and a reverse type. Normal type light control sheets are opaque and optically non-transparent when a voltage is not applied, and become transparent when a voltage is applied. Reverse type light control sheets are transparent when a voltage is not applied, and become opaque and optically non-transparent when a voltage is applied. Optical transparency refers to a characteristic that allows an object to be recognized in shape, color, and the like when viewed via the light control sheet.

SUMMARY OF THE INVENTION

According to an aspect of the present invention, a light control sheet includes a first transparent electrode, a second transparent electrode, a first light control layer positioned between the first and second transparent electrodes, and having light transmission property which is variable by a change in a voltage across the first and second transparent electrodes, and a voltage control unit which applies an AC voltage across the first and second transparent electrodes, and changes a frequency of the AC voltage applied.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5(a)-5(c) are a set of views for illustrating operation of the light control sheet according to the first embodiment, in which FIG. 5(a) shows a waveform of AC voltage applied to the light control sheet, FIG. 5(b) shows a timing when the light control layer instantaneously allows light transmission, and FIG. 5(c) shows a timing when a camera captures an image.

FIGS. 7(a)-7(d) are a set of views for illustrating operation of the imaging system according to the first embodiment, in which FIG. 7(a) shows a waveform of AC voltage applied to the light control sheet, FIG. 7(b) shows a timing when the light control layer allows light transmission, FIG. 7(c) shows a timing when a camera that is not permitted to capture images captures an image, and FIG. 7(d) shows a timing when a camera that is permitted to capture images captures an image.

FIGS. 9(a)-9(e) are a set of views for illustrating an operation of the light control sheet according to the second embodiment, in which FIG. 9(a) shows a waveform of a first AC voltage applied to the light control sheet, FIG. 9(b) shows a waveform of a second AC voltage applied to the light control sheet, FIG. 9(c) shows a timing when the first light control layer instantaneously allows light transmission, FIG. 9(d) shows a timing when the second light control layer instantaneously allows light transmission, and FIG. 9(e) shows a timing when a camera captures an image.

FIGS. 11(a)-11(f) are a set of views for illustrating an operation of the imaging system according to the second embodiment, in which FIG. 11(a) shows a waveform of the first AC voltage applied to the light control sheet, FIG. 11(b) shows a waveform of the second AC voltage applied to the light control sheet, FIG. 11(c) shows a timing when the first light control layer instantaneously allows light transmission, FIG. 11(d) shows a timing when the second light control layer instantaneously allows light transmission, FIG. 11(e) shows a timing when a camera that is not permitted to capture images captures an image, and FIG. 11(f) shows a timing when a camera that is permitted to capture images captures an image.

DESCRIPTION OF THE EMBODIMENTS

Figure 1:
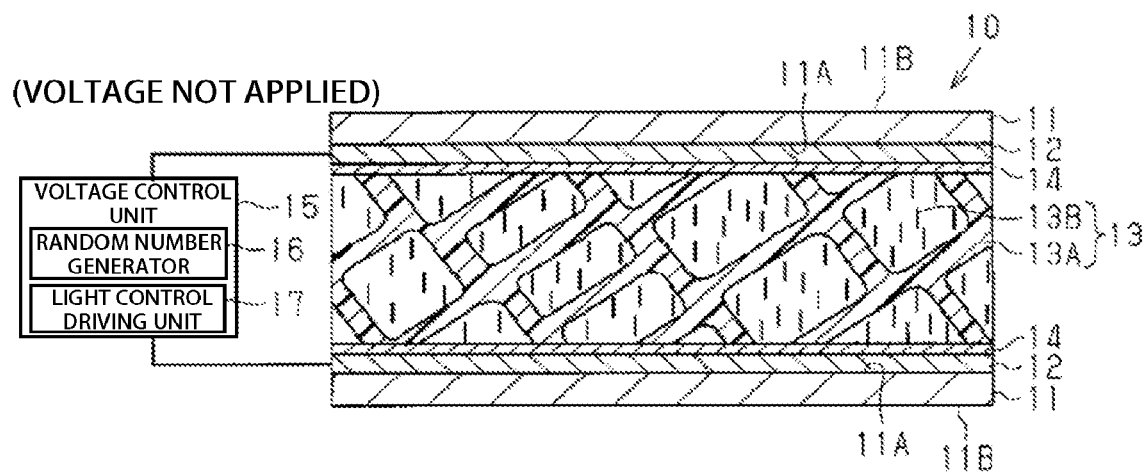
FIG. 1 is a cross-sectional view illustrating a schematic configuration of a light control sheet according to a first embodiment when voltage is not applied.

The embodiments will now be described with reference to the accompanying drawings, wherein like reference numerals designate corresponding or identical elements throughout the various drawings.

First Embodiment

Referring to FIGS. 1 to 7(d), a first embodiment of a light control sheet and an imaging system will be described.

As shown in FIG. 1, a light control sheet 10 includes a pair of substrates 11, a pair of transparent electrodes 12, a light control layer 13, alignment film 14, and a voltage control unit 15.

The pair of substrates 11 are optically transparent. The substrate 11 may be made of materials such as glass or polymer films of polyethylene, polystyrene, polyethylene terephthalate, polyvinyl alcohol, polycarbonate, polyvinyl chloride, polyimide, polysulfone, or the like. Each substrate 11 has a first surface 11A and a second surface 11B with the respective first surfaces 11A facing each other, and each of the pair of transparent electrodes 12 is provided on the corresponding first surface 11A.

The pair of transparent electrodes 12 are optically transparent. The transparent electrodes 12 are made of conductive metal oxide such as tin-doped indium oxide (ITO), tin oxide (TO), or fluorine-doped tin oxide (FTO), which are applied or printed by known methods or deposited by vapor deposition such as sputtering onto the entire or part of the respective first surfaces 11A of the substrates 11. Further, the light control layer 13 is disposed on a side of the transparent electrodes 12 opposite to that contacting the substrate 11. In other words, the light control layer 13 is disposed between each of the pair of the transparent electrodes 12.

The light control layer 13 has a polymer network liquid crystal (PNLC) structure, in which continuous layers of liquid crystal molecules 13B are disposed in a random mesh of a polymeric resin 13A. For example, the liquid crystal molecules 13B have positive dielectric constant anisotropy, and the dielectric constant of the liquid crystal molecules 13B in the major axis direction is larger than the dielectric constant of the liquid crystal molecules 13B in the minor axis direction. Examples of the liquid crystal molecules 13B include those based on Schiff bases, azo types, azoxy types, biphenyls, terphenyls, benzoic acid esters, tolans, pyrimidines, cyclohexanecarboxylic acid esters, phenylcyclohexanes, and dioxanes.

The PNLC structure of the light control layer 13 can be produced by known methods for phase separation between polymers and liquid crystals, for example, polymerization induced phase separation (PIPS), thermally induced phase separation (TIPS), and solvent induced phase separation (SIPS). PIPS is a process by which polymer precursors based on acrylic, thiol, epoxy, or the like, which are polymerized by heat or light, are mixed with liquid crystals so that they are polymerized in a homogeneous phase state and then separated in phase. TIPS is a process by which thermoplastic resins and liquid crystals are mixed and then heated in a homogeneous phase state so that they are separated when cooled. SIPS is a process by which polymers and liquid crystals are dissolved in a solvent such as chloroform so that phase separation between polymers and liquid crystals is performed by evaporating the solvent.

The alignment film 14 is provided on an electrode surface of each transparent electrode 12 which faces the light control layer 13, and is made of, for example, organic compounds such as polyimides, polyamides, polyvinyl alcohols, and cyanide compounds, inorganic compounds such as silicone, $SiO_2$, and $ZrO_2$, or mixtures thereof. The alignment film 14 is a vertical alignment film, which causes the major axis direction of the liquid crystal molecules 13B to be oriented perpendicular to the electrode surface of each transparent electrode 12.

The voltage control unit 15 includes a random number generator 16 and a light control driving unit 17. The voltage control unit 15 is not limited to that having a central processing unit (CPU) and a variety of memories and configured to process all the various types of processing, described later, with software. For example, the voltage control unit 15 may include a hardware (application specific integrated circuit, ASIC) that performs at least part of the various types of processing. That is, the voltage control unit 15 can be configured as a circuit including one or more dedicated hardware circuits such as an ASIC, one or more processors (microcomputers) that operate according to computer programs (software), or a combination thereof.

The random number generator 16 executes, for example, a program generating random numbers, the program being stored in a read only memory to generate random numbers at a predetermined time cycle, for example, 0.1 milliseconds to 0.7 milliseconds.

The light control driving unit 17 obtains a random number value generated by the random number generator 16, and controls the frequency of the AC voltage applied across the two transparent electrodes 12 on the basis of the obtained random number value. Since the random number value supplied from the random number generator 16 varies at a predetermined time cycle (for example, within the range from 0.1 milliseconds to 0.7 milliseconds), the light control driving unit 17 changes the frequency of the AC voltage applied across the two transparent electrodes 12 at the same time cycle. The light control layer 13 causes phase transition of liquid crystals in response to the application mode of the AC voltage applied across the two transparent electrodes 12 by the light control driving unit 17.

Specifically, as shown in FIG. 1, when an AC voltage is not applied across the two transparent electrodes 12 by the light control driving unit 17, the phase state of liquid crystals is a homeotropic phase in which the major axis direction of the liquid crystal molecules 13B is oriented perpendicular to the electrode surface of the respective transparent electrodes 12 by the function of the alignment film 14 as described above.

Figure 2:
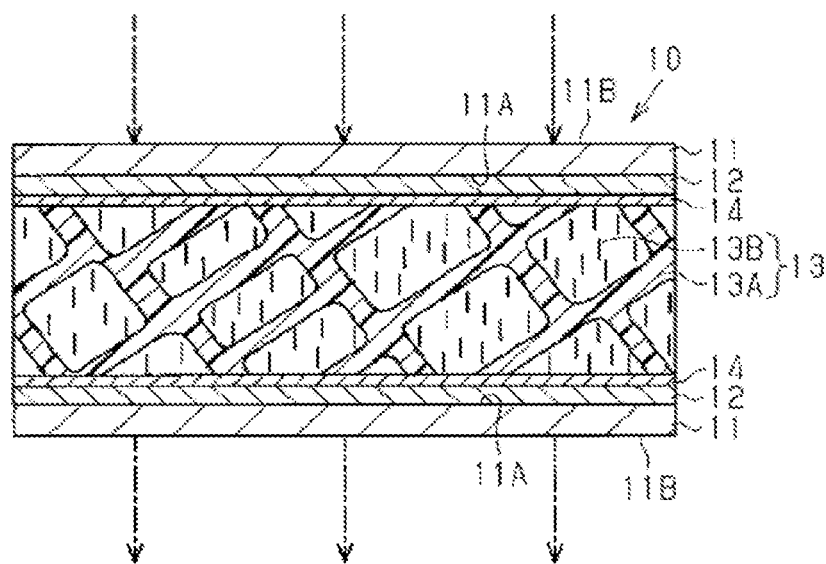
FIG. 2 is a cross-sectional view illustrating optical properties of the light control sheet according to the first embodiment when voltage is not applied.

When the liquid crystal molecules 13B are aligned, the refractive index of the liquid crystal molecules 13B and the refractive index of the polymeric resin 13A almost match each other. Accordingly, light incident on the light control sheet 10 is not greatly deviated from the traveling direction, allowing the light control sheet 10 to be transparent. Therefore, as shown in FIG. 2, light incident on the light control sheet 10 is transmitted in the thickness direction of the light control sheet 10, and thus the light control sheet 10 is transparent to light.

Figure 3:
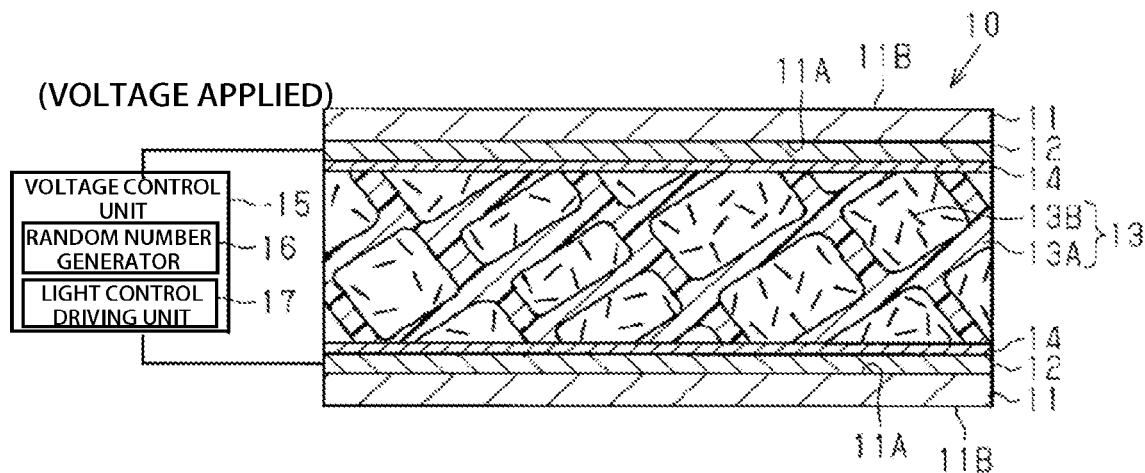
FIG. 3 is a cross-sectional view illustrating a schematic configuration of the light control sheet according to the first embodiment when voltage is applied.

As shown in FIG. 3, when an AC voltage is applied across the two transparent electrodes 12 by the light control driving unit 17, the phase state of liquid crystals becomes a focal conic phase in which the major axis direction of the liquid crystal molecules 13B, which also depends on the polymeric resin 13A adjacent to the liquid crystal molecules 13B, is randomly oriented.

Figure 4:
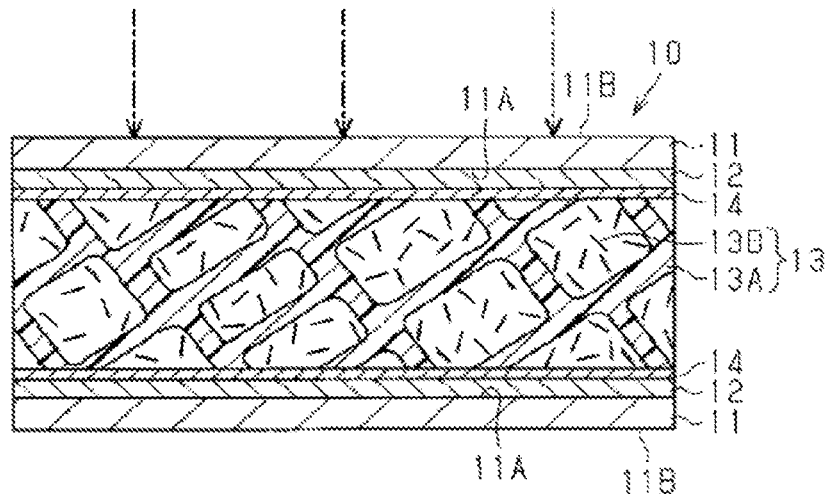
FIG. 4 is a cross-sectional view illustrating optical properties of the light control sheet according to the first embodiment when voltage is applied.

When the liquid crystal molecules 13B are not aligned, light incident on the light control sheet 10 is greatly deviated from the traveling direction and thus dispersed, allowing the light control sheet 10 to be opaque. Therefore, as shown in FIG. 4, light incident on the light control sheet 10 is diffused without being transmitted in the thickness direction of the light control sheet 10, and thus the light control sheet 10 is non-transparent to light.

Optical transparency is a characteristic that allows an object located in one of two spaces separated by the light control sheet 10 to be recognized in shape, color, and the like when viewed from the other space via the light control sheet.

Next, an effect of the light control sheet 10 according to the embodiment described above will now be described, especially focusing on a shading function of the light control sheet 10, which is achieved by means of optical non-transparency of the light control layer 13 when an AC voltage is applied.

Figure 5A:
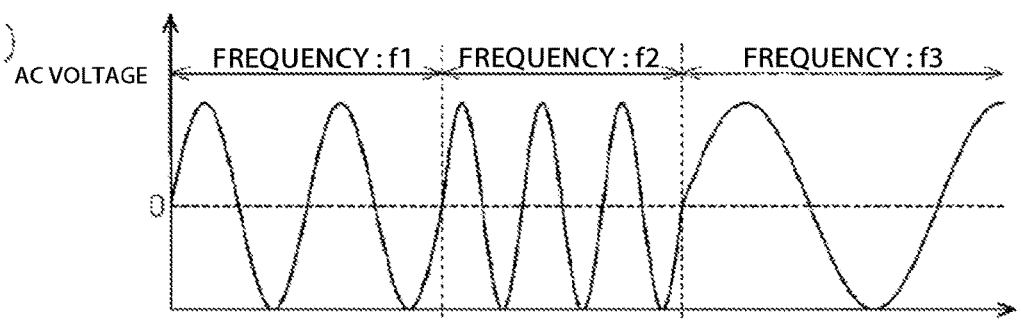
Figure 5B:
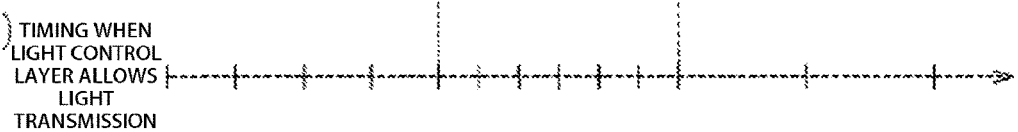

In an example shown in FIG. 5(a), the light control driving unit 17 obtains a first random number from the random number generator 16, and then applies an AC voltage across the two transparent electrode 12 at a first frequency f1 on the basis of the obtained first random number value. Here, as shown in FIG. 5(b), at a timing when positive and negative instantaneous values of AC voltage applied across the two transparent electrodes 12 by the light control driving unit 17 are switched, the light control layer 13 instantaneously allows light transmission, even if an AC voltage is being applied, in the same manner as it does when an AC voltage is not applied. In this case, the light control driving unit 17 applies an AC voltage across the two transparent electrodes 12 at a relatively high frequency, for example, approximately 360 Hz. Since the light control layer 13 instantaneously switches whether to transmit light or not at a time cycle of a degree that cannot be visually recognized by human eyes, the light control sheet 10 can perform a shading function.

Figure 5C:
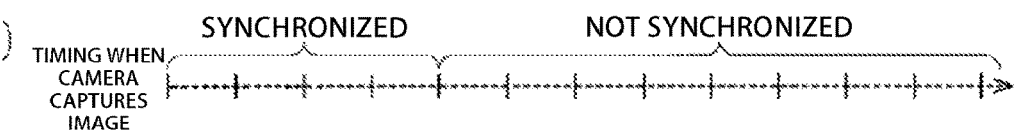

However, although such a relatively high frequency does not allow human eyes to detect switching, it may allow a camera for capturing images to detect switching. With the frequency of approximately 360 Hz described above, it is relatively easy to synchronize between a timing when positive and negative instantaneous values of AC voltage are switched and a timing when a camera obtains pixel data. Accordingly, as shown in FIG. 5(c), if a timing when the light control layer 13 shown in FIG. 5(b) instantaneously allows light transmission and a timing when a camera captures an image (a timing when a camera obtains pixel data) are synchronized, a shading function of the light control sheet 10 will fail to be performed. As a result, an image of a space behind the light control sheet 10 can be captured by a camera. In this case, if a camera can obtain pixel data for the entire frame image, it is possible for the camera to capture an image of the space behind the light control sheet 10 as a video image by synchronizing between a timing when the light control layer 13 instantaneously allows light transmission and a timing when the camera captures an image as described above within a time period that the light control layer 13 instantaneously allows light transmission. Further, even if a camera cannot obtain pixel data for the entire frame image within a time period that the light control layer 13 instantaneously allows light transmission, it is possible for the camera to capture an image of the space behind the light control sheet 10 as a still image by combining pixel data for a unit row of the frame image if the pixel data for a unit row can be obtained. That is, synchronization between a timing when the light control layer 13 instantaneously allows light transmission and a timing when the camera captures an image may lead to a failure in achieving the shading function of the light control sheet 10 in an appropriate manner regardless of the length of the time period for which the light control layer 13 instantaneously allows light transmission.

In this regard, as shown in FIG. 5(a), the light control driving unit 17 obtains a second random number from the random number generator 16 when the random number generated by the random number generator 16 is switched from the first random number to the second random number. The light control driving unit 17 then applies an AC voltage across the two transparent electrodes 12 at a second frequency f2 on the basis of the second random number value thus obtained. In this case, in the example shown in FIG. 5(a), since the second frequency f2 is a value higher than the first frequency f1 described above, the timing when the light control layer 13 instantaneously allows light transmission is shortened as shown in FIG. 5(b). That is, in line with switching of the frequency of the AC voltage applied across the two transparent electrodes 12 by the light control driving unit 17, the time interval for the timing when the light control layer 13 instantaneously allows light transmission is also changed. As shown in FIG. 5(c), synchronization between a timing when the light control layer 13 instantaneously allows light transmission and a timing when the camera captures an image is not maintained after the frequency of the applied AC voltage is switched. As a result, a shading function of the light control sheet 10 is appropriately performed.

In general, there is a positive correlation between the frequency of the AC voltage applied across the two transparent electrodes 12 by the light control driving unit 17 and the amount of power consumption by the light control sheet 10. Accordingly, as the frequency of the AC voltage increases, the power consumption by the light control sheet 10 tends to increase. In this regard, the frequency of the AC voltage applied across the two transparent electrodes 12 by the light control driving unit 17 is changed with the elapse of time, instead of being merely increased to an extremely large degree. This makes it difficult to synchronize between the timings described above. Accordingly, a shading function of the light control sheet 10 is appropriately performed while the power consumption by the light control sheet 10 is reduced.

In particular, the light control driving unit 17 randomly switches the frequency of the AC voltage applied across the two transparent electrodes 12 on the basis of the random number generated by the random number generator 16. As a consequence, compared with the case where the frequency of the AC voltage applied across the two transparent electrodes 12 by the light control driving unit 17 is switched according to a constant rule, it becomes difficult for an external device such as a camera to analyze the switching pattern of the frequency of the AC voltage applied across the two transparent electrodes 12. Accordingly, it is even more difficult to synchronize between a timing when the light control layer 13 instantaneously allows light transmission and a timing when the camera captures an image. This allows a shading function of the light control sheet 10 to be performed in a further appropriate manner.

Moreover, the random number generator 16 switches the random number at a predetermined time cycle (for example, within the range from 0.1 milliseconds to 0.7 milliseconds). The light control driving unit 17 switches the frequency of the AC voltage applied across the two transparent electrodes 12 at the same time cycle as that for switching of the random number by the random number generator 16. In the example shown in FIG. 5(a), after the random number generated by the random number generator 16 is switched from the first random number to the second random number, the random number generated by the random number generator 16 is further switched from the second random number to a third random number. When the random number is switched, the light control driving unit 17 obtains the third random number from the random number generator 16. Accordingly, the light control driving unit 17 applies an AC voltage across the two transparent electrodes 12 at a third frequency f3 on the basis of the third random number thus obtained. As described above, a time period during which the frequency of the AC voltage applied across the two transparent electrodes 12 by the light control driving unit 17 is constant is prevented from being extremely long. As a result, this makes it further difficult to analyze the switching pattern of the frequency of the AC voltage applied across the two transparent electrodes 12 due to the restriction in analysis time available to an external device such as a camera. Accordingly, it is further difficult to synchronize between a timing when the light control layer 13 instantaneously allows light transmission and a timing when the camera captures an image. This allows a shading function of the light control sheet 10 to be performed in a further appropriate manner.

In addition, the light control driving unit 17 switches the frequency of the AC voltage applied at a time point when the instantaneous value of the AC voltage applied across the two transparent electrodes 12 reaches 0[V]. That is, the light control driving unit 17 switches the frequency of the AC voltage while aligning the instantaneous value and the phase of the AC voltage at a time point when the random number value generated by the random number generator 16 is switched and the instantaneous value of the AC voltage reaches 0[V]. As a result, the instantaneous value of the AC voltage continuously changes before and after the frequency of the AC voltage is switched. Accordingly, deterioration of the light control layer 13 due to noncontinuous AC voltage being applied across the two transparent electrodes 12 by the light control driving unit 17 can be reduced.

According to the light control sheet 10 of the aforementioned embodiment, a shading function of the light control sheet 10 is performed so that imaging of the space behind the light control sheet 10 by a camera becomes difficult. However, there may be a case where it is desired to specially permit a particular camera to capture images, while restricting an ordinary camera from capturing images. In order to accommodate such a demand, an imaging system in which the light control sheet 10 is linked to a camera 20 is provided.

Figure 6:
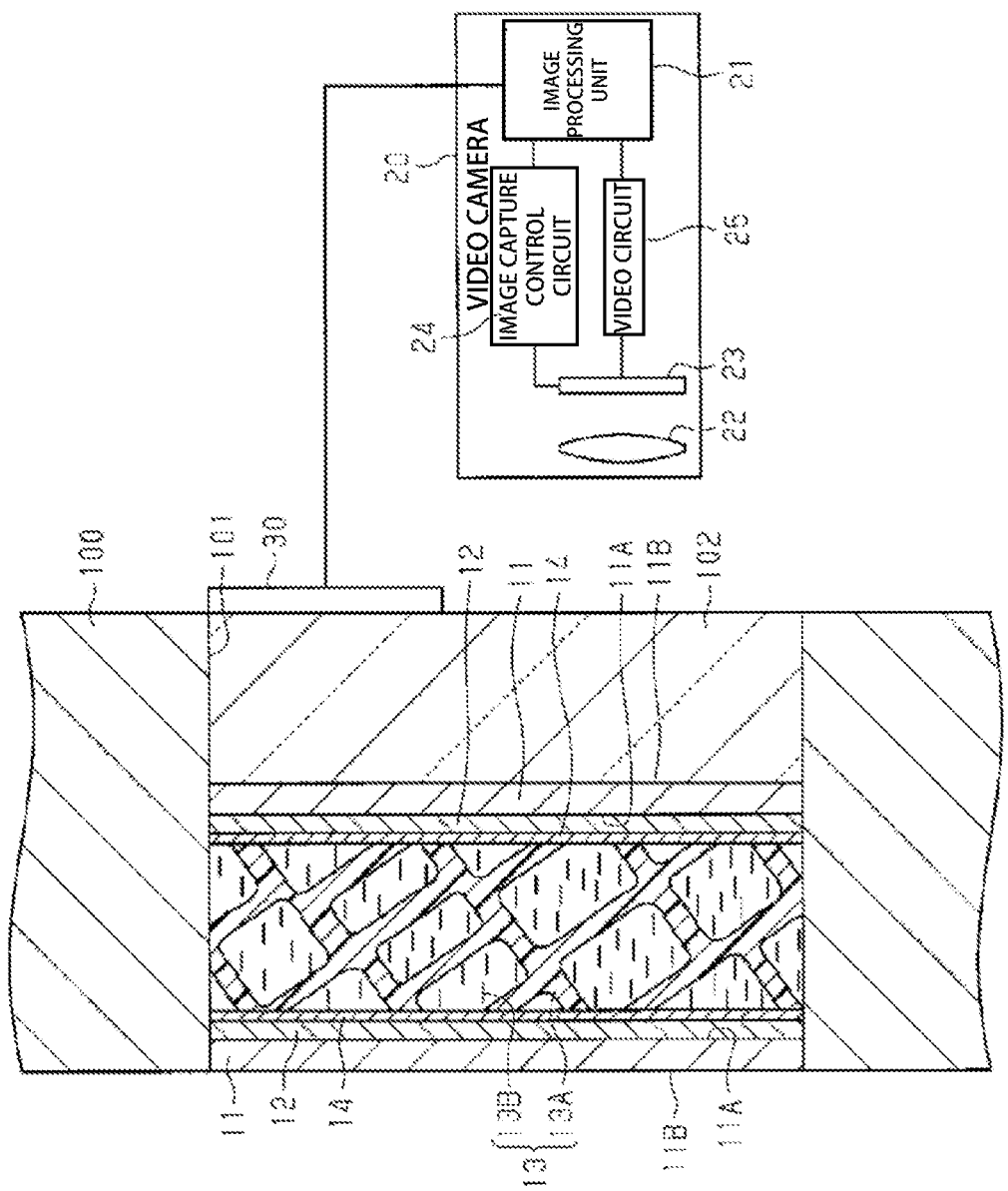
FIG. 6 is a cross-sectional view illustrating a schematic configuration of an imaging system according to the first embodiment.

As shown in FIG. 6, an opening 101 such as a window frame on a wall 100 is provided with a light control window 102 to which the light control sheet 10 is attached. An imaging system is located adjacent to the light control window 102. The camera 20 captures an image of a space located behind the wall 100 via the light control sheet 10 and the light control window 102.

More specifically, the camera 20 includes an image processing unit 21. The image processing unit 21 executes various programs to perform various control operations for the camera 20. The image processing unit 21 is not limited to that having a central processing unit (CPU) and a variety of memories and configured to perform all the various types of processing with software. For example, the image processing unit 21 may include hardware (application specific integrated circuit, ASIC) that performs at least part of the various types of processing. That is, the image processing unit 21 can be configured as a circuit including one or more dedicated hardware circuits such as ASICs, one or more processors (microcomputers) that operate according to computer programs (software), or a combination thereof.

Further, the camera 20 includes an imaging element 23 for imaging the subject light which has passed through the imaging lens 22 in an imaging space of the imaging lens 22. The imaging element 23 includes, for example, a charge coupled device (CCD) image sensor or a complementary metal oxide semiconductor (CMOS) image sensor, and accumulates signal charges corresponding to a subject image formed on an imaging surface of the imaging element 23, and outputs the accumulated signal charges as analog signals (pixel data), which are called pixel signals.

Further, the image processing unit 21 is connected to an image capture control circuit 24 and a video circuit 25, which are connected to the imaging element 23. The image capture control circuit 24 drives the imaging element 23 to control exposure time, conversion of a formed image into an electric signal, output of the converted electric signal, and the like. The video circuit 25 amplifies an analog signal outputted by the imaging element 23, converts the amplified analog signal into a digital pixel signal, and outputs the converted digital pixel signal to the image processing unit 21.

The image processing unit 21 performs image processing such as color interpolation, tone correction, white balancing, and contour compensation to the digital pixel signal supplied from the video circuit 25 to thereby generate specific image data.

The image processing unit 21 is connected to a conductive pad 30 fixed to a surface of the light control window 102 on a side opposite to that contacting the light control sheet 10. The light control sheet 10 is an input side of the conductive pad 30, and the conductive pad 30 is an output side of the light control sheet 10. The light control window 102, which serves as a capacitor, and the substrate 11 are connected in serial between the light control sheet 10 and the conductive pad 30. The conductive pad 30 and the light control sheet 10 are capacitively coupled via the light control window 102 and the substrate 11.

The conductive pad 30 faces one of the two transparent electrodes 12, which is adjacent to the light control window 102, over a large area, with the light control window 102 and the substrate 11 interposed therebetween. The amount of voltage applied to the aforementioned one of the transparent electrodes 12 is also reflected to the amount of electric charge applied to the conductive pad 30. That is, an AC voltage is applied to the aforementioned one of the transparent electrodes 12, and temporal transition of the instantaneous value of the AC voltage is reflected as appropriate to the amount of electric charge applied to the conductive pad 30. The image processing unit 21 obtains the amount of electric charge applied to the conductive pad 30 as information regarding the AC voltage frequency. The image processing unit 21 repeatedly obtains information regarding the AC voltage frequency, and obtains the change in the amount of voltage applied to the aforementioned one of the transparent electrodes 12 by monitoring information regarding the AC voltage frequency. The image processing unit 21 can detect the frequency of the AC voltage applied to the transparent electrodes 12 of the light control sheet 10 in real time by monitoring the temporal transition of the amount of electric charge applied to the conductive pad 30. The image processing unit 21 controls the image capture control circuit 24 on the basis of the AC voltage frequency detected via the conductive pad 30 to thereby control the timing when the imaging element 23 outputs an analog signal. That is, the image processing unit 21 controls the image capture interval (image capture timing) for the camera 20 on the basis of the AC voltage frequency detected via the conductive pad 30.

Thus, the camera 20 detects the frequency of the applied voltage on the basis of the change in the amount of electric charge of the conductive pad 30. Here, the camera 20 can also obtain frequency information of the AC voltage on the basis of data other than the change in the amount of electric charge. For example, a configuration described below can also be employed. That is, a storage medium such as a USB memory having a security authentication function may be connected to the camera 20. In the storage medium, a table representing a relationship between the random numbers described above and the AC voltage frequency is pre-stored. The voltage control unit 15 communicates with the camera 20 via the storage medium, and transmits random number data to the camera 20. The camera 20 detects the AC voltage frequency on the basis of the received random number data and the above table.

Specifically, in the example shown in FIG. 7(a), the light control driving unit 17 obtains a changed random number value when the random number generated by the random number generator 16 is changed in a cyclic manner as with the case shown in FIG. 5(a). The light control driving unit 17 applies an AC voltage across the two transparent electrodes 12 on the basis of the obtained random number value at a corresponding frequency.

Here, as shown in FIG. 7(b), at a timing when positive and negative instantaneous values of AC voltage applied across the two transparent electrodes 12 by the light control driving unit 17 are switched, the light control layer 13 instantaneously allows light transmission in the same manner as it does when an AC voltage is not applied.

Further, as shown in FIG. 7(c), even if the synchronization is performed between the timing when the light control layer 13 instantaneously allows light transmission and a timing when an image is captured, once the AC voltage frequency is switched, a camera that is not permitted to capture images, that is, a camera that cannot obtain information regarding the AC voltage frequency, fails to maintain synchronization thereafter.

On the other hand, as shown in FIG. 7(d), a camera that is permitted to capture images, that is, a camera that can obtain information regarding the AC voltage frequency, monitors the change in the amount of electric charge applied to the conductive pad 30. The camera that is permitted to capture images can obtain a changed frequency immediately after the frequency of the applied AC voltage is changed. The image processing unit 21 controls the image capture interval for the camera 20 on the basis of the changed frequency thus obtained. Accordingly, synchronization between a timing when the light control layer 13 instantaneously allows light transmission and a timing when the camera 20 captures an image is maintained after the frequency of the applied AC voltage is changed.

Specifically, the image processing unit 21 of the camera 20 monitors the amount of electric charge of the conductive pad 30, which is capacitively coupled to the light control sheet 10, to thereby obtain the frequency of the AC voltage applied to the light control sheet 10. Accordingly, the image processing unit 21 of the camera 20 can reliably obtain the frequency of the AC voltage applied to the light control sheet 10 in real time. As a result, synchronization between a timing when the light control layer 13 instantaneously allows light transmission and a timing when the camera 20 captures an image is suitably achieved.

As described above, according to the above first embodiment, the following advantageous effects can be obtained.

(1) The voltage control unit 15 changes the frequency of the AC voltage applied across the two transparent electrodes 12 by the light control driving unit 17. Accordingly, it is difficult to synchronize between a timing when the light control layer 13 instantaneously allows light transmission and a timing when an image is captured. This improves reliability of a shading function of the light control sheet 10.

(2) The voltage control unit 15 causes the instantaneous value of the AC voltage to be continuously changed before and after the frequency of the AC voltage is changed. Accordingly, compared with the case where the voltage control unit 15 causes the instantaneous value of the AC voltage to be discontinuously changed before and after the frequency of the AC voltage is changed, deterioration of the light control layer 13 can be reduced.

(3) The voltage control unit 15 includes the random number generator 16 that generates a random number, and sets the AC voltage frequency on the basis of the random number generated by the random number generator 16. Accordingly, compared with the case where the voltage control unit 15 changes the AC voltage frequency according to a constant rule, it is more difficult to synchronize between a timing when the light control layer 13 instantaneously allows light transmission and a timing when an image is captured. This further improves reliability of a shading function of the light control sheet 10.

(4) The camera 20 obtains information from the light control sheet 10 on the frequency of the AC voltage applied to the light control sheet 10, and synchronizes a timing when the light control layer 13 instantaneously allows light transmission and a timing when an image is captured. Accordingly, for a camera that cannot obtain information regarding the frequency of the AC voltage, it is difficult to synchronize between a timing when the light control layer 13 instantaneously allows light transmission and a timing when an image is captured. On the other hand, the camera 20 that can obtain information regarding the frequency of the AC voltage, that is, the camera 20 that is specially permitted to capture images, can capture an image of the space shielded by the light control sheet 10 on the basis of information regarding the frequency of the AC voltage obtained from the light control sheet 10.

Second Embodiment

Referring to FIGS. 8 to 11, a second embodiment of a light control sheet and an imaging system will be described. The following description will be made focusing on the difference from the first embodiment, and components which are the same as those of the first embodiment are denoted by the same reference signs and the description thereof will be omitted.

Figure 8:
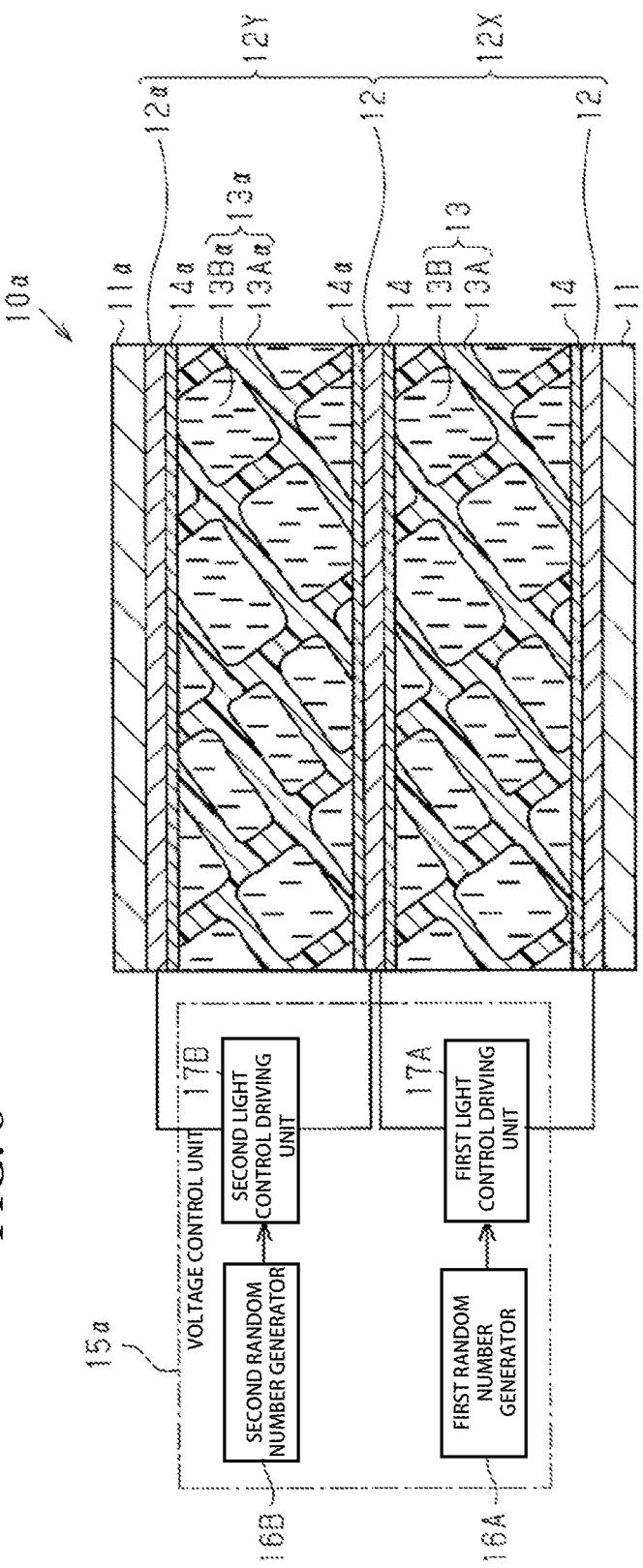
FIG. 8 is a cross-sectional view illustrating a schematic configuration of a light control sheet according to a second embodiment.

As shown in FIG. 8, a light control sheet 10α includes a light control layer 13α which is overlapped with the two transparent electrodes 12 (a first transparent electrode and a second transparent electrode), a transparent electrode 12α (a third transparent electrode) which is overlapped with the light control layer 13α, and a substrate 11α which is overlapped with the transparent electrode 12α when viewed in a direction perpendicular to the light control sheet 10α. The respective transparent electrodes 12 are first transparent electrodes 12X, and one of the two first transparent electrodes 12X (second transparent electrode), which is located closer to the transparent electrode 12α, is the transparent electrode 12 different from the transparent electrode 12α. This transparent electrode 12 and the transparent electrode 12α constitute two second transparent electrodes 12Y. That is, these two second transparent electrodes 12Y are laminated on the light control layer 13. The light control layer 13 is a first light control layer, and the light control layer 13α located between the two second transparent electrodes 12Y is a second light control layer.

These two second transparent electrodes 12Y are disposed in substantially the same manner relative to the light control layer 13α as the first transparent electrodes 12X are disposed relative to the light control layer 13. An alignment film 14α is disposed on an electrode surface of each second transparent electrodes 12Y which faces the light control layer 13α. The alignment film 14α is a vertical alignment film, which causes the major axis direction of the liquid crystal molecules 13B to be oriented perpendicular to the electrode surface of the second transparent electrodes 12Y.

The light control layer 13α, having the same configuration as that of the light control layer 13, has a polymer network liquid crystal (PNLC) structure, in which continuous layers of liquid crystal molecules 13Bα are disposed in a random mesh of a polymeric resin 13Aα. When an AC voltage is not applied across the two second transparent electrodes 12Y, the phase state of liquid crystals in the light control layer 13α is a homeotropic phase in which the major axis direction of the liquid crystal molecules 13B is oriented perpendicular to the electrode surface of the respective transparent electrodes 12Y by the function of the alignment film 14α as described above. When the liquid crystal molecules 13Bα are aligned, the refractive index of the liquid crystal molecules 13Bα and the refractive index of the polymeric resin 13Aα are substantially consistent with each other. Accordingly, light incident on the light control layer 13α is not greatly deviated from the traveling direction, allowing the light control layer 13α to be optically transparent. On the other hand, when an AC voltage is applied across the second two transparent electrodes 12Y, the phase state of liquid crystals in the light control layer 13α becomes a focal conic phase in which the major axis direction of the liquid crystal molecules 13Bα, which also depends on the polymeric resin 13Aα adjacent to the liquid crystal molecules 13Bα, is randomly oriented. When the liquid crystal molecule 13Bα are not aligned, light incident on the light control layer 13α is greatly deviated from the traveling direction and thus dispersed, allowing the light control layer 13α to be opaque.

A voltage control unit 15α includes a first random number generator 16A, a first light control driving unit 17A, a second random number generator 16B, and a second light control driving unit 17B. The voltage control unit 15α is not limited to that having a central processing unit (CPU) and a variety of memories and configured to process all the various types of processing, described later, with software. For example, the voltage control unit 15α may include a hardware (application specific integrated circuit, ASIC) that performs at least part of the various types of processing. That is, the voltage control unit 15α can be configured as a circuit including one or more dedicated hardware circuits such as ASICs, one or more processors (microcomputers) that operate according to computer programs (software), or a combination thereof.

The first random number generator 16A executes, for example, a generation program for random numbers, stored in a read only memory, to generate random numbers at a predetermined time cycle, for example, 0.1 milliseconds to 0.7 milliseconds.

The first light control driving unit 17A obtains a random number value generated by the first random number generator 16A, and controls the frequency of the AC voltage applied across the two first transparent electrodes 12X on the basis of the obtained random number value. Since the random number value supplied from the first random number generator 16A varies at a predetermined time cycle (for example, within the range from 0.1 milliseconds to 0.7 milliseconds) as described above, the first light control driving unit 17A changes the frequency of the AC voltage applied across the two first transparent electrodes 12X at the same time cycle. The light control layer 13 causes phase transition of liquid crystals in response to the application mode of the AC voltage applied across the two first transparent electrodes 12X by the first light control driving unit 17A.

Further, the second random number generator 16B executes, for example, a generation program for random numbers stored in a read only memory to generate random numbers at a predetermined time cycle, for example, 0.1 milliseconds to 0.7 milliseconds.

The second light control driving unit 17B obtains a random number value generated by the second random number generator 16B, and controls the frequency of the AC voltage applied across the two second transparent electrodes 12Y on the basis of the obtained random number value. Since the random number value supplied from the second random number generator 16B varies at a predetermined time cycle (for example, within the range from 0.1 milliseconds to 0.7 milliseconds) as described above, the second light control driving unit 17B changes the frequency of the AC voltage applied across the two second transparent electrodes 12Y at the same time cycle. The light control layer 13α causes phase transition of liquid crystals in response to the application mode of the AC voltage applied across the two second transparent electrodes 12Y by the second light control driving unit 17B.

Next, an effect of the light control sheet 10α according to the embodiment described above will now be described, especially focusing on a shading function of the light control sheet 10α, which is achieved by means of optical non-transparency of the light control layer 13 and the light control layer 13α when an AC voltage is applied.

As shown in FIG. 9(a), the first light control driving unit 17A obtains a first random number from the first random number generator 16A, and then applies an AC voltage across the two first transparent electrodes 12X at a first frequency f1α on the basis of the obtained first random number value. Here, as shown in FIG. 9(c), at a timing when positive and negative instantaneous values of AC voltage applied across the two first transparent electrodes 12X by the first light control driving unit 17A are switched, the light control layer 13 instantaneously allows light transmission, even if an AC voltage is being applied, in the same manner as it does when an AC voltage is not applied. In this case, the first light control driving unit 17A applies an AC voltage across the two first transparent electrodes 12X at a relatively high frequency, for example, approximately 360 Hz. Since the light control layer 13 instantaneously switches whether to transmit light or not at a time cycle of a degree that cannot be visually recognized by human eyes, the light control sheet 10α can perform a shading function.

Furthermore, as shown in FIG. 9(b), the second light control driving unit 17B obtains a second random number from the second random number generator 16B, and then applies an AC voltage across the two second transparent electrodes 12Y at a first frequency f1β on the basis of the obtained second random number value. Here, as shown in FIG. 9(d), at a timing when positive and negative instantaneous values of AC voltage applied across the two second transparent electrodes 12Y by the second light control driving unit 17B are switched, the light control layer 13α instantaneously allows light transmission, even if an AC voltage is being applied, in the same manner as it does when an AC voltage is not applied. In this case, the second light control driving unit 17B applies an AC voltage across the two second transparent electrodes 12Y at a relatively high frequency, for example, approximately 360 Hz. Since the light control layer 13α instantaneously switches whether to transmit light or not at a time cycle of a degree that cannot be visually recognized by human eyes, the light control sheet 10α can perform a shading function.

However, as described above, although such a relatively high frequency does not allow human eyes to detect switching, it may allow a camera for capturing images to detect switching. With the frequency of approximately 360 Hz described above, it is relatively easy to synchronize a timing when positive and negative instantaneous values of AC voltage are switched and a timing when a camera obtains pixel data.

In this regard, as shown in FIGS. 9(a) and 9(b), the frequency of the AC voltage applied across the two first transparent electrodes 12X by the first light control driving unit 17A and the frequency of the AC voltage applied across the two second transparent electrodes 12Y by the second light control driving unit 17B are different from each other. Accordingly, as shown in FIGS. 9(c) and 9(d), the frequency at which both the light control layer 13 and the light control layer 13α instantaneously allow light transmission decreases. As a consequence, compared with the case where a shading function of the light control sheet 10 is achieved by a single light control layer 13 as in the above first embodiment, it becomes difficult for an external device such as the camera 20 to analyze the timing when the light control sheet 10α instantaneously allows light transmission. Accordingly, as shown in FIG. 9(e), it is further difficult to synchronize between a timing when the light control sheet 10α instantaneously allows light transmission and a timing when the camera captures an image. This allows a shading function of the light control sheet 10α to be performed in a further appropriate manner.

In particular, the first light control driving unit 17A and the second light control driving unit 17B set the frequencies of the AC voltage applied to the transparent electrodes 12X and 12Y, respectively, on the basis of the random number values individually outputted from the random number generators 16A and 16B, respectively. Since there is no correlation between the frequencies of the AC voltage applied to each of the transparent electrodes 12X and 12Y, it becomes further difficult for an external device such as the camera 20 to analyze the timing when the light control sheet 10α instantaneously allows light transmission. Accordingly, it is further difficult to synchronize between a timing when the light control sheet 10α instantaneously allows light transmission and a timing when the camera 20 captures an image. This allows a shading function of the light control sheet 10α to be performed in a further appropriate manner.

According to the light control sheet 10α of the aforementioned embodiment, a shading function of the light control sheet 10α is performed so that imaging of the space behind the light control sheet 10α by a camera 20 becomes difficult. However, there may be a case where it is desired to specially permit a particular camera 20 to capture images, while restricting an ordinary camera 20 to capture images. In order to accommodate such a demand, an imaging system in which the light control sheet 10α is linked to a camera 20 is provided.

Figure 10:
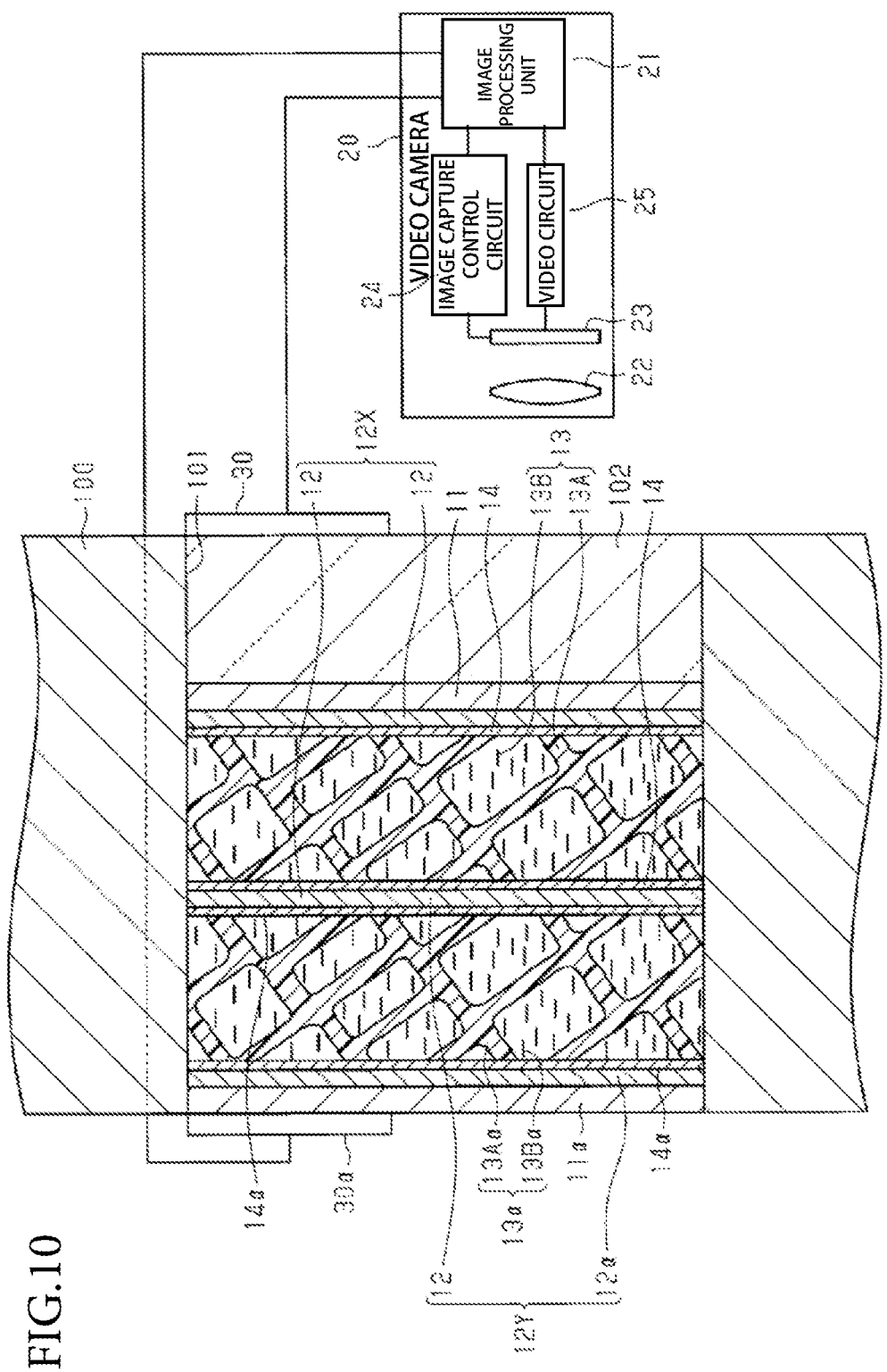
FIG. 10 is a cross-sectional view illustrating a schematic configuration of an imaging system according to the second embodiment.

As shown in FIG. 10, an opening 101 such as a window frame on a wall 100 is provided with a light control window 102 to which the light control sheet 10α is attached. An imaging system is located adjacent to the light control window 102. The camera 20 captures an image of a space located behind the wall 100 via the light control sheet 10α and the light control window 102.

Here, the image processing unit 21 of the camera 20 is connected to a conductive pad 30 fixed to a surface of the light control window 102 on a side opposite to that contacting the light control sheet 10α, and also connected to a conductive pad 30α fixed to a surface of the light control sheet 10α on a side opposite to that contacting the light control window 102.

The light control sheet 10α is an input side of the conductive pad 30, and the conductive pad 30 is an output side of the light control sheet 10α. The light control window 102, which serves as a capacitor, and the substrate 11 are connected in serial between the light control sheet 10α and the conductive pad 30. Accordingly, the conductive pad 30 and the light control sheet 10α are capacitively coupled via the light control window 102 and the substrate 11.

The conductive pad 30 faces one of the two first transparent electrodes 12X, which is adjacent to the light control window 102, over a large area with the light control window 102 and the substrate 11 interposed therebetween. The amount of voltage applied to the aforementioned one of the first transparent electrodes 12X is also reflected to the amount of electric charge applied to the conductive pad 30. The image processing unit 21 monitors the amount of electric charge applied to the conductive pad 30 to thereby obtain the amount of voltage applied to the first transparent electrode 12X of the light control sheet 10α. As described above, since a voltage is applied to the first transparent electrode 12X of the light control sheet 10α as an AC voltage, temporal transition of the instantaneous value of this AC voltage is reflected as appropriate to the amount of electric charge applied to the conductive pad 30. The image processing unit 21 detects the frequency of the AC voltage applied to the first transparent electrode 12X of the light control sheet 10α in real time by monitoring the temporal transition of the amount of electric charge applied to the conductive pad 30.

Furthermore, the light control sheet 10α is an input side of the conductive pad 30α, and the conductive pad 30α is an output side of the light control sheet 10α. The substrate 11α, which serves as a capacitor, is connected in serial between the light control sheet 10α and the conductive pad 30α. Accordingly, the conductive pad 30α and the light control sheet 10α are capacitively coupled via the substrate 11α.

The conductive pad 30α faces one of the two second transparent electrodes 12Y, which is located farther from the light control window 102, over a large area with the substrate 11α interposed therebetween. The amount of voltage applied to the aforementioned one of the second transparent electrode 12Y is also reflected to the amount of electric charge applied to the conductive pad 30α. The image processing unit 21 monitors the amount of electric charge applied to the conductive pad 30α to thereby obtain the amount of voltage applied to the second transparent electrode 12Y of the light control sheet 10α. As described above, since a voltage is applied to the second transparent electrode 12Y of the light control sheet 10α as an AC voltage, temporal transition of the instantaneous value of this AC voltage is reflected as appropriate to the amount of electric charge applied to the conductive pad 30α. The image processing unit 21 detects the frequency of the AC voltage applied to the second transparent electrode 12Y of the light control sheet 10α in real time by monitoring the temporal transition of the amount of electric charge applied to the conductive pad 30α.

The image processing unit 21 controls the image capture control circuit 24 on the basis of the AC voltage frequency detected via the conductive pad 30 and the conductive pad 30α to thereby control the timing when the imaging element 23 outputs an analog signal. That is, the image processing unit 21 controls the image capture interval (image capture timing) for the camera 20.

Specifically, in the example shown in FIG. 11(a), the first light control driving unit 17A obtains a changed random number value when the random number generated by the first random number generator 16A is changed in a cyclic manner as with the case shown in FIG. 9(*a*). The first light control driving unit 17A applies an AC voltage across the two first transparent electrodes 12X on the basis of the obtained random number value at a corresponding frequency.

Here, as shown in FIG. 11(*c*), at a timing when positive and negative instantaneous values of AC voltage applied across the two first transparent electrodes 12X by the first light control driving unit 17A are switched, the light control layer 13 instantaneously allows light transmission in the same manner as it does when an AC voltage is not applied.

Furthermore, in the example shown in FIG. 11(*b*), the second light control driving unit 17B obtains a changed random number value when the random number generated by the second random number generator 16B is changed in a cyclic manner as with the case shown in FIG. 9(*b*). The second light control driving unit 17B applies an AC voltage across the two second transparent electrodes 12Y on the basis of the obtained random number value at a corresponding frequency.

Here, as shown in FIG. 11(*d*), at a timing when positive and negative instantaneous values of AC voltage applied across the two second transparent electrodes 12Y by the second light control driving unit 17B are switched, the light control layer 13α instantaneously allows light transmission in the same manner as it does when an AC voltage is not applied.

Further, as shown in FIG. 11(*e*), for a camera that is not permitted to capture images, it is difficult to synchronize between a timing when both the light control layer 13 and the light control layer 13α instantaneously allow light transmission and a timing when the camera captures an image.

On the other hand, as shown in FIG. 11(*f*), a camera that is permitted to capture images monitors the change in the amount of electric charge applied to the conductive pads 30 and 30α. The camera that is permitted to capture images can immediately obtain the frequency of the applied AC voltage. The image processing unit 21 controls the image capture interval for the camera 20 on the basis of the frequency thus obtained. As a result, synchronization between a timing when both the light control layer 13 and the light control layer 13α instantaneously allow light transmission and a timing when the camera 20 captures an image is achieved.

Specifically, the image processing unit 21 of the camera 20 monitors the amount of electric charge applied to the conductive pad 30 capacitively coupled to the light control sheet 10α and the amount of electric charge applied to the conductive pad 30α capacitively coupled to the light control sheet 10α to thereby obtain the frequency of the AC voltage applied to each of the first transparent electrode 12X and the second transparent electrode 12Y. As a result, the image processing unit 21 of the camera 20 can reliably obtain the frequency of the AC voltage applied across the two transparent electrodes 12X and across the two transparent electrodes 12Y in real time. Accordingly, synchronization between a timing when both the light control layer 13 and the light control layer 13α instantaneously allow light transmission and a timing when the camera 20 captures an image is suitably achieved.

As described above, according to the above second embodiment, the following advantageous effect can be obtained.

(5) Since the light control sheet 10α includes the plurality of light control layers 13 and 13α, which are overlapped with each other, a shading function of the light control sheet 10α can be further improved in reliability by offsetting the timings when each of the light control layers 13 and 13α instantaneously allows light transmission.

Other Embodiments

Further, the above embodiments may also be implemented as the following modifications.

The camera 20 obtains the amount of electric charge of the conductive pads 30 and 30α as the amount of voltage applied to the transparent electrodes 12 and 12α. This may be modified such that the voltage control units 15 and 15α of the light control sheets 10 and 10α and the image processing unit 21 of the camera 20 include a communication unit for communicating information regarding the frequency of the AC voltage. When the frequency of the AC voltage applied to the transparent electrodes 12 and 12α of the light control sheets 10 and 10α is changed, the voltage control units 15 and 15α of the light control sheets 10 and 10α transmits information regarding the changed AC voltage frequency to the image processing unit 21 of the camera 20. The image processing unit 21 of the camera 20 receives information regarding the frequency of the AC voltage, and, on the basis of the received information, synchronizes between a timing when the light control layers 13 and 13α instantaneously allow light transmission and a timing when the camera 20 captures an image. According to this configuration, an effect similar to the above (4) can be achieved without providing the conductive pad 30.

The camera 20 that is permitted to capture images aligns the image capture interval with the frequency of the AC voltage applied to the light control sheets 10 and 10α. This may be modified such that the camera 20 that is permitted to capture images aligns the image capture interval with a period of an integer multiple of a cycle of the AC voltage applied to the light control sheets 10 and 10α. According to this configuration, temporal restrictions on the image capture interval can be reduced by the camera 20.

The number of light control layers of the light control sheet 10α may be modified to three or more, and the timings when the respective light control layers instantaneously allows light transmission may be different from each other. With this configuration, it is further difficult to synchronize between the timings when all the light control layers instantaneously allow light transmission and a timing when the camera captures an image. This allows the reliability of a shading function of the light control sheet 10α to be further improved.

The light control sheet 10α may also include two transparent electrodes 12 (first transparent electrodes 12X), two transparent electrodes 12α (second transparent electrodes 12Y), the light control layer 13 disposed between the two transparent electrodes 12, and the light control layer 13α (second light control layer) disposed between the two transparent electrodes 12α. In this case, the voltage control unit 15α applies an AC voltage across the two transparent electrodes 12, and applies an AC voltage across the two transparent electrodes 12α. According to this configuration as well, an effect similar to the above (5) can be achieved. Further, since the transparent electrode 12 serving as both the first transparent electrode 12X and the second transparent electrode 12Y is not provided, the frequencies of the AC voltage applied to each of the light control layers 13 and 13α can be easily changed at separate timings.

The voltage control unit 15α controls the frequencies of the AC voltage applied by the first light control driving unit 17A and the second light control driving unit 17B to the transparent electrodes 12X and 12Y, respectively, on the basis of the random number values individually outputted from the first random number generator 16A and the second random number generator 16B, respectively. This may be modified such that the voltage control unit 15α controls the frequencies of the AC voltage applied by the first light control driving unit 17A and the second light control driving unit 17B to the corresponding transparent electrodes 12X and 12Y, respectively, on the basis of the random number values which are generated from a common random number generator at different timings.

The voltage control units 15 and 15α control the frequencies of the AC voltage applied to the transparent electrodes 12X and 12Y on the basis of the random number value obtained from the random number generators 16, 16A, and 16B. This may be modified such that the voltage control units 15 and 15α select any numerical value according to a predetermined rule from among a group of numerical values which are prepared in advance, and control the frequencies of the AC voltage applied to the transparent electrodes 12X and 12Y on the basis of the selected numerical value. In this case, the group of numerical values described above is preferably a group of numerical values of prime numbers in order to improve the reliability of a shading function of the light control sheets 10 and 10α.

The voltage control units 15 and 15α change the frequency of the AC voltage at a time point when the instantaneous value of the AC voltage applied to the transparent electrodes 12X and 12Y reaches 0[V]. This may be modified such that the voltage control units 15 and 15α may not necessarily change the frequency of the AC voltage at a time point when the instantaneous value of the AC voltage exactly reaches 0[V], but may change the frequency of the AC voltage at a time point when the instantaneous value of the AC voltage is near 0[V]. That is, the voltage control units 15 and 15α may not necessarily change the instantaneous value of the AC voltage in a continuous manner before and after the frequency of the AC voltage is changed, but may allow some discrete values of the instantaneous value of the AC voltage before and after the frequency is changed.

The voltage control units 15 and 15α may also monitor at least one of the phase of the AC voltage and the instantaneous value of the AC voltage, and change the frequency of the AC voltage while aligning with the values that are monitored. According to this configuration as well, an effect similar to the above (2) can be achieved.

The present invention may be applied to image display systems which use the light control sheets 10 and 10α as a projection screen. These image display systems are configured to project image light onto the light control sheets 10 and 10α, which are optically non-transparent. In this configuration, it is also difficult to synchronize between a timing when the light control layers 13 and 13α of the light control sheets 10 and 10α instantaneously allow light transmission and a timing when a camera captures an image. Accordingly, an image displayed on the light control sheets 10 and 10α can be prevented from being recorded by a camera that is not permitted to capture images. Further, the image display system may be a rear projection type (transmission type) in which image light is projected from a rear side of the light control sheets 10 and 10α, or a front projection type (reflection type) in which image light is projected from a front side of the light control sheets 10 and 10α.

In the above embodiments, the light control layers 13 and 13α of the light control sheets 10 and 10α may have a polymer dispersed liquid crystal (PDLC) structure, in which a liquid crystal layer is formed by dispersing liquid crystal molecules in polymers, may be a liquid crystal layer formed by dispersing liquid crystal molecules in a solvent which does not contain polymers, or may be a light control layer formed not to contain liquid crystal molecules. In brief, the light control layers 13 and 13α may have any configuration as long as they are configured to optically transparent when a voltage is not applied, and optically non-transparent when a voltage is applied.

The light control sheets 10 and 10α may also be a normal type. In normal type light control sheets, a visible function of the light control sheets is not appropriately performed when a timing when the light control layer instantaneously blocks light transmission and a timing when a camera captures an image are synchronized. In this regard, according to a configuration in which the frequency of the AC voltage is changed, synchronization between a timing when the light control layer instantaneously blocks light transmission and a timing when a camera captures an image can be reduced to thereby ensure the visible function of the light control sheets to be appropriately performed.

The present application addresses the following. The spaces separated by light control sheets are briefly categorized into spaces that are frequently required to be shaded (that is, non-visible) and spaces that are frequently required to be visible. Spaces that are frequently required to be shaded are, for example, meeting rooms in offices and private rooms in hospitals. Spaces that are frequently required to be visible are, for example, display windows of shops. For both of these two types of spaces, images can be taken by imaging devices.

Here, optical non-transparency in the reverse type and optical transparency in the normal type are achieved by application of an AC voltage. In the reverse type, application of voltage for shading light is repeatedly performed at a cycle by which light transmission through the light control sheet is not visually recognized. In the normal type, application of voltage for transmitting light is repeatedly performed at a cycle by which light shading by the light control sheet is not visually recognized.

Meanwhile, imaging devices that capture an image of the space as described above obtain pixel data for a unit row (scan line) at a predetermined cycle to generate a single still image from a plurality of pixel data. In so doing, in the reverse type light control sheets, if a timing when application of voltage for shading light is not performed and a timing when the pixel data for a unit row is obtained match each other, it results in generation of a single still image only from the pixel data obtained when light is transmitted. As a result, a shading function of the light control sheet may fail to be performed. In the normal type light control sheets, if a timing when application of voltage for transmitting light is not performed and a timing when the pixel data for a unit row is obtained match each other, it results in generation of a single still image only from the pixel data obtained when light is not transmitted. As a result, a light transmission function of the light control sheet may fail to be performed.

Similarly, in imaging devices that capture a video image from frame images, which are a time series combination of a plurality of still images, a single still image may be generated only from the pixel data obtained when light is transmitted. As a consequence, in the reverse type light control sheets, a video image may be generated from a combination of still images generated only from the pixel data obtained when light is transmitted. This leads to a failure in performing a shading function by the light control sheet. Further, in the normal type light control sheets, a video image may be generated from a combination of still images generated only from the pixel data obtained when light is not transmitted. This leads to a failure in performing a transmission function by the light control sheet.

That is, there may be contradiction between the light transmission properties of the light control sheet determined on the basis of visual recognition and the result of image capture by imaging devices, leading to an unintended result of image capture for a user of the light control sheet or an unintended result of image capture for a user of the imaging device.

The present invention has an aspect to provide a light control sheet and an imaging system having improved reliability of the functions of the light control sheet.

A light control sheet includes a first transparent electrode, a second transparent electrode, a first light control layer which is disposed between the two transparent electrodes, the first light control layer having light transmission properties which are changed by alteration in a voltage applied across the two transparent electrodes, and a voltage control unit that applies AC voltage as the voltage applied across the two transparent electrodes, and changes a frequency of the applied AC voltage.

According to the above configuration, since the frequency of the AC voltage applied across the two transparent electrodes is changed, it is difficult to synchronize between a timing when the light control layer instantaneously allows light transmission and a timing when an imaging device obtains pixel data. Further, it is difficult to synchronize between a timing when the light control layer does not instantaneously allow light transmission and a timing when an imaging device captures pixel data. Accordingly, the reliability of the visible function and non-visible function of the light control sheet can be improved.

In the above configuration, the voltage control unit may continuously change an instantaneous value of AC voltage before and after the frequency of AC voltage is changed. Further, in the above configuration, the voltage control unit may align a phase of AC voltage before the frequency of AC voltage is changed with a phase of AC voltage after the frequency of AC voltage is changed at a time point when the frequency of AC voltage is changed.

According to the above configuration, compared with the case where the instantaneous value of the AC voltage is discontinuously changed before and after the frequency of the AC voltage is changed, deterioration of the light control layer can be reduced.

In the above configuration, the voltage control unit may include a random number generator that generates a random number, and set the AC voltage frequency on the basis of the random number generated by the random number generator.

According to the above configuration, compared with the case where the AC voltage frequency is changed according to a constant rule, it is more difficult to synchronize between a timing when the light control layer instantaneously allows light transmission and a timing when an imaging device captures pixel data. Further, it is even more difficult to synchronize between a timing when the light control layer does not instantaneously allow light transmission and a timing when an imaging device captures pixel data. Accordingly, the reliability of the visible and non-visible function of the light control sheet can be further improved.

In the above configuration, the light control sheet may further include a third transparent electrode, and a second light control layer disposed between the second transparent electrode and the third transparent electrode, the second light control layer having light transmission properties which are changed by alteration in a voltage applied across the transparent electrodes disposed on both sides of the second light control layer, wherein the voltage control unit may apply AC voltages to the first light control layer and the second light control layer at frequencies different from each other.

According to the above configuration, the light control sheet is composed of a plurality of laminated light control layers, and the timings when each of the light control layers instantaneously allows light transmission are offset. Accordingly, the reliability of the non-visible function of the light control sheet can be further improved.

An imaging system includes: the light control sheet according to the above configuration; and a camera that obtains information from the light control sheet regarding a frequency of AC voltage applied to the light control sheet, and obtains pixel data from an image captured via the light control sheet at an image capture interval, which is an integer multiple of an AC voltage cycle.

According to the above configuration, for a camera that cannot obtain information regarding the frequency of the AC voltage, it is difficult to synchronize between a timing when the light control layer instantaneously allows light transmission and a timing when the camera obtains pixel data. Further, it is difficult to synchronize between a timing when the light control layer does not instantaneously allow light transmission and a timing when the camera obtains pixel data. Therefore, the reliability of the visible function and non-visible function of the light control sheet is improved. On the other hand, a camera that can obtain information regarding the frequency of the AC voltage can capture an image of the space shielded by the light control sheet or the space visually observed via the light control sheet on the basis of information regarding the frequency of the AC voltage obtained from the light control sheet.

According to embodiments of the present invention, the functions of light control sheets can be improved in reliability.

REFERENCE SIGNS LIST 10, 10α: light control sheet
11, 11α: substrate
11A: first surface
11B: second surface
12, 12α, 12X, 12Y: transparent electrode (first transparent electrode, second transparent electrode)
13, 13α: light control layer (first light control layer, second light control layer)
13A, 13Aα: polymeric resin
13B, 13Bα: liquid crystal molecule
14, 14α: alignment film
15, 15α: voltage control unit
16, 16A, 16B: random number generator (first random number generator, second random number generator)
17, 17A, 17B: light control driving unit (first light control driving unit, second light control driving unit)
20: camera
21: image processing unit
22: imaging lens
23: imaging element
24: image capture control circuit
25: video circuit
30, 30α: conductive pad (first conductive pad, second conductive pad)
100: wall
101: opening
102: light control window Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
   a first transparent electrode;
   a second transparent electrode;
   a light control layer positioned between the first and second transparent electrodes and having light transmission property such that the light transmission property is variable by a change in a voltage applied across the light control layer between the first and second transparent electrodes; and
   a voltage control unit comprising circuitry configured to apply an AC voltage across the light control layer between the first and second transparent electrodes and comprising light control driving circuitry and random number generator circuitry such that the random number generator circuitry is configured to switch from one of random numbers corresponding to different frequencies of the AC voltage respectively to a different one of the random numbers in a cycle and that the light control driving circuitry is configured to obtain each of the random numbers in the cycle and switch from one of the frequencies of the AC voltage corresponding to the one of the random numbers to a different one of the frequencies of the AC voltage corresponding to the different one of the random numbers based on each of the random numbers obtained from the random number generator circuitry.

2. The light control sheet of claim 1, wherein the circuitry of the voltage control unit is configured to continuously change an instantaneous value of AC voltage before and after the frequency of AC voltage is changed.

3. The light control sheet of claim 2, wherein the circuitry of the voltage control unit is configured to align a phase of the AC voltage before change in the frequency of the AC voltage with a phase of the AC voltage after the change in the frequency of the AC voltage at a time of changing the frequency of the AC voltage.

4. The light control sheet of claim 3, further comprising:
   a third transparent electrode; and
   a second light control layer positioned between the second transparent electrode and the third transparent electrode and having light transmission property such that the second light control layer is variable by a change in a voltage across the second and third transparent electrodes,
   wherein the voltage control unit is configured to apply AC voltages across the light control layer and the second light control layer at frequencies different from each other.

5. The light control sheet of claim 3, wherein the light control layer includes liquid crystal which has an orientation that makes the light control layer optically transparent when the AC voltage is not applied, and optically non-transparent when the AC voltage is applied.

6. The light control sheet of claim 2, wherein the light control layer has a polymer network liquid crystal structure comprising a polymeric resin mesh and liquid crystal molecules disposed in the polymeric resin mesh.

7. The light control sheet of claim 2, further comprising:
   a third transparent electrode; and
   a second light control layer positioned between the second transparent electrode and the third transparent electrode and having light transmission property such that the second light control layer is variable by a change in a voltage across the second and third transparent electrodes,
   wherein the voltage control unit is configured to apply AC voltages across the light control layer and the second light control layer at frequencies different from each other.

8. The light control sheet of claim 2, wherein the light control layer includes liquid crystal which has an orientation that makes the light control layer optically transparent when the AC voltage is not applied, and optically non-transparent when the AC voltage is applied.

9. An imaging system, comprising:
   the light control sheet of claim 2; and
   a camera device configured to obtain from the light control sheet the frequency of the AC voltage applied to the light control sheet, and obtain pixel data from an image captured via the light control sheet at an interval equal to an integer multiple of an AC voltage cycle.

10. The light control sheet of claim 1, wherein the circuitry of the voltage control unit is configured to align a phase of the AC voltage before change in the frequency of the AC voltage with a phase of the AC voltage after the change in the frequency of the AC voltage at a time of changing the frequency of the AC voltage.

11. The light control sheet of claim 10, wherein the light control layer has a polymer network liquid crystal structure comprising a polymeric resin mesh and liquid crystal molecules disposed in the polymeric resin mesh.

12. The light control sheet of claim 10, further comprising:
   a third transparent electrode; and
   a second light control layer positioned between the second transparent electrode and the third transparent electrode and having light transmission property such that the second light control layer is variable by a change in a voltage across the second and third transparent electrodes,
   wherein the voltage control unit is configured to apply AC voltages across the light control layer and the second light control layer at frequencies different from each other.

13. The light control sheet of claim 10, wherein the light control layer includes liquid crystal which has an orientation that makes the light control layer optically transparent when the AC voltage is not applied, and optically non-transparent when the AC voltage is applied.

14. An imaging system, comprising:
   the light control sheet of claim 10; and
   a camera device configured to obtain from the light control sheet the frequency of the AC voltage applied to the light control sheet, and obtain pixel data from an image captured via the light control sheet at an interval equal to an integer multiple of an AC voltage cycle.

15. The light control sheet of claim 1, wherein the light control layer has a polymer network liquid crystal structure comprising a polymeric resin mesh and liquid crystal molecules disposed in the polymeric resin mesh.

16. The light control sheet of claim 1, further comprising:
   a third transparent electrode; and
   a second light control layer positioned between the second transparent electrode and the third transparent electrode and having light transmission property such that the second light control layer is variable by a change in a voltage across the second and third transparent electrodes, wherein the voltage control unit is configured to apply AC voltages across the light control layer and the second light control layer at frequencies different from each other.

17. The light control sheet of claim 1, wherein the light control layer includes liquid crystal which has an orientation that makes the light control layer optically transparent when the AC voltage is not applied, and optically non-transparent when the AC voltage is applied.

18. An imaging system, comprising:
the light control sheet of claim 1; and
a camera device configured to obtain from the light control sheet the frequency of the AC voltage applied to the light control sheet, and obtain pixel data from an image captured via the light control sheet at an interval equal to an integer multiple of an AC voltage cycle.

19. A light control sheet, comprising:
a first transparent electrode;
a second transparent electrode;
a light control layer positioned between the first and second transparent electrodes and having light transmission property such that the light transmission property is variable by a change in a voltage applied across the light control layer between the first and second transparent electrodes; and
a voltage control unit comprising circuitry configured to apply an AC voltage across the light control layer between the first and second transparent electrodes and change randomly switch a frequency of the AC voltage from one frequency to another frequency in a cycle based on each of random numbers corresponding to different frequencies of the AC voltage respectively such that the light transmission property is maintained by switching the frequency of the AC voltage from one frequency to another frequency applied by the first and second transparent electrodes in a cycle.

20. An imaging system, comprising:
a light control sheet; and
a camera configured to obtain from the light control sheet a frequency of an AC voltage applied to the light control sheet, and obtain pixel data from an image captured via the light control sheet at an interval equal to an integer multiple of an AC voltage cycle,
wherein the light control sheet comprises a first transparent electrode, a second transparent electrode, a first light control layer positioned between the first and second transparent electrodes and having light transmission property such that the light transmission property is variable by a change in a voltage applied across the first light control layer between the first and second transparent electrodes, and a voltage control unit configured to apply an AC voltage across the first light control layer between the first and second transparent electrodes and change the frequency of the AC voltage applied.

* * * * *